United States Patent
Feroz et al.

(10) Patent No.: US 7,551,623 B1
(45) Date of Patent: Jun. 23, 2009

(54) MODULATION OF PARTITION PARAMETERS ACHIEVING DELAY-BASED QOS MECHANISM

(75) Inventors: Azeem Feroz, Cupertino, CA (US); James J. Stabile, Los Altos, CA (US); Wei-Lung Lai, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 594 days.

(21) Appl. No.: 11/048,033

(22) Filed: Jan. 31, 2005

(51) Int. Cl.
*H04L 12/28* (2006.01)
(52) U.S. Cl. ............... 370/395.21; 370/468; 709/224
(58) Field of Classification Search ............ None
See application file for complete search history.

(56) References Cited

U.S. PATENT DOCUMENTS

| | | | |
|---|---|---|---|
| 6,047,322 A * | 4/2000 | Vaid et al. ............... 709/224 |
| 6,408,005 B1 * | 6/2002 | Fan et al. ................ 370/412 |
| 6,438,134 B1 * | 8/2002 | Chow et al. ............. 370/412 |
| 6,628,609 B2 * | 9/2003 | Chapman et al. ........ 370/229 |
| 6,650,645 B2 * | 11/2003 | Scott et al. ........... 370/395.71 |
| 6,671,258 B1 * | 12/2003 | Bonneau ................ 370/235 |
| 6,724,727 B2 * | 4/2004 | Counterman ........... 370/235 |
| 6,976,087 B1 * | 12/2005 | Westfall et al. ......... 709/238 |
| 7,072,295 B1 * | 7/2006 | Benson et al. .......... 370/230 |
| 7,072,344 B2 * | 7/2006 | Abdelilah et al. ..... 370/395.21 |
| 7,085,249 B2 * | 8/2006 | Lohtia et al. ........... 370/329 |
| 7,292,542 B2 * | 11/2007 | Wright ................... 370/256 |
| 7,362,704 B2 * | 4/2008 | Sisto et al. ............. 370/230 |
| 7,406,522 B2 * | 7/2008 | Riddle .................. 709/226 |
| 2003/0061263 A1 * | 3/2003 | Riddle ................... 709/104 |
| 2003/0088529 A1 * | 5/2003 | Klinker et al. ............ 706/3 |
| 2003/0202525 A1 * | 10/2003 | Nagatomo .............. 370/411 |
| 2005/0089054 A1 * | 4/2005 | Ciancaglini et al. ...... 370/412 |

* cited by examiner

*Primary Examiner*—Phirin Sam
(74) *Attorney, Agent, or Firm*—Baker Botts L.L.P.

(57) ABSTRACT

Methods, apparatuses and systems directed to an adaptive partitioning mechanism responsive to observed latency conditions in a communications network. Embodiments of the present invention can be configured to adapt to changing network conditions and ensure that selected network applications meet desired QoS levels. In one implementation, the present invention provides a mechanism that adjusts the minimum bandwidth setting corresponding to a given partition in response to observed latency. According to one implementation, a latency threshold is configured relative to local queuing latency or a latency metric corresponding to the network itself. A process modulates the minimum bandwidth setting associated with one or more partitions in response to observed latency relative to the configured threshold.

17 Claims, 7 Drawing Sheets

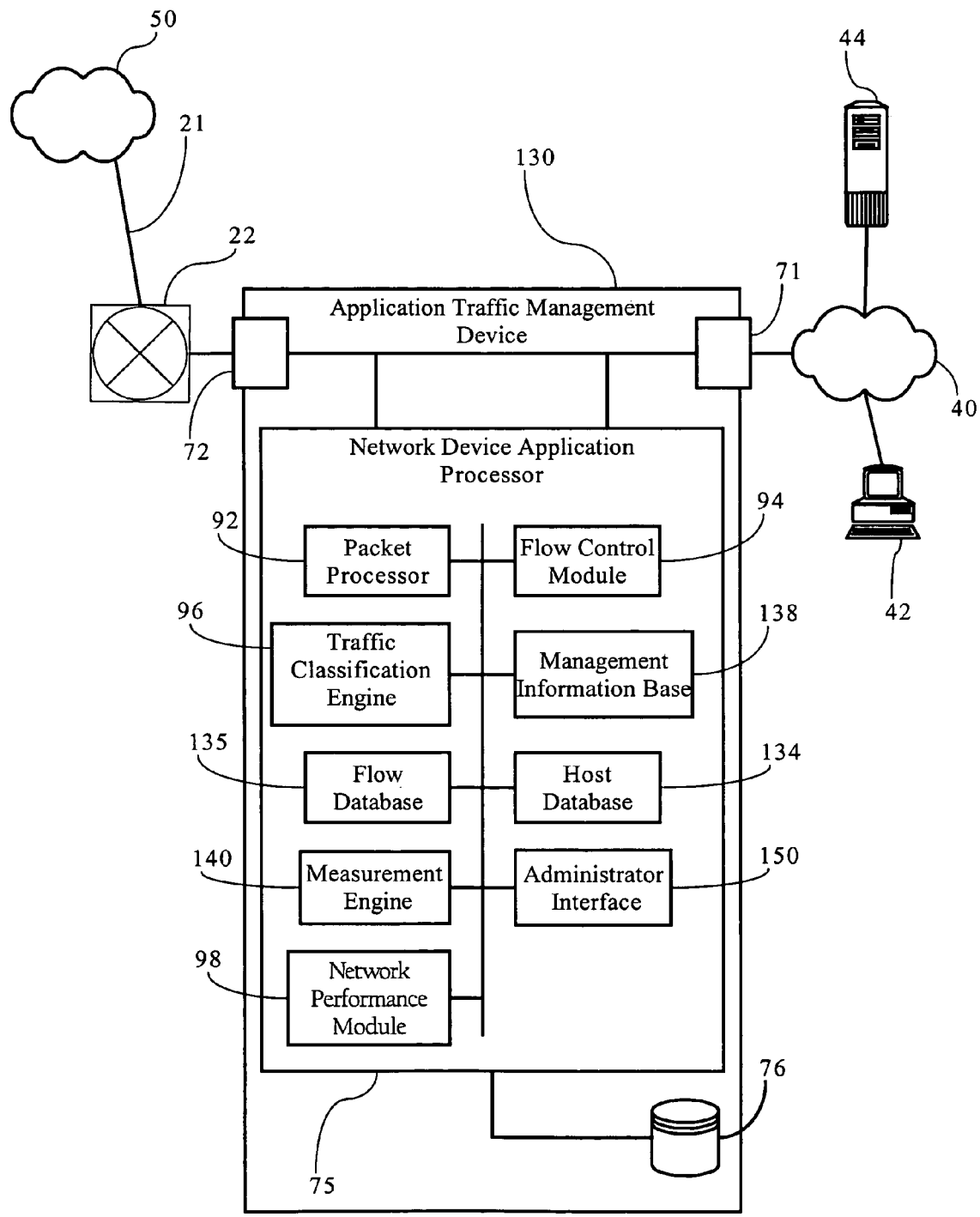
Fig._2

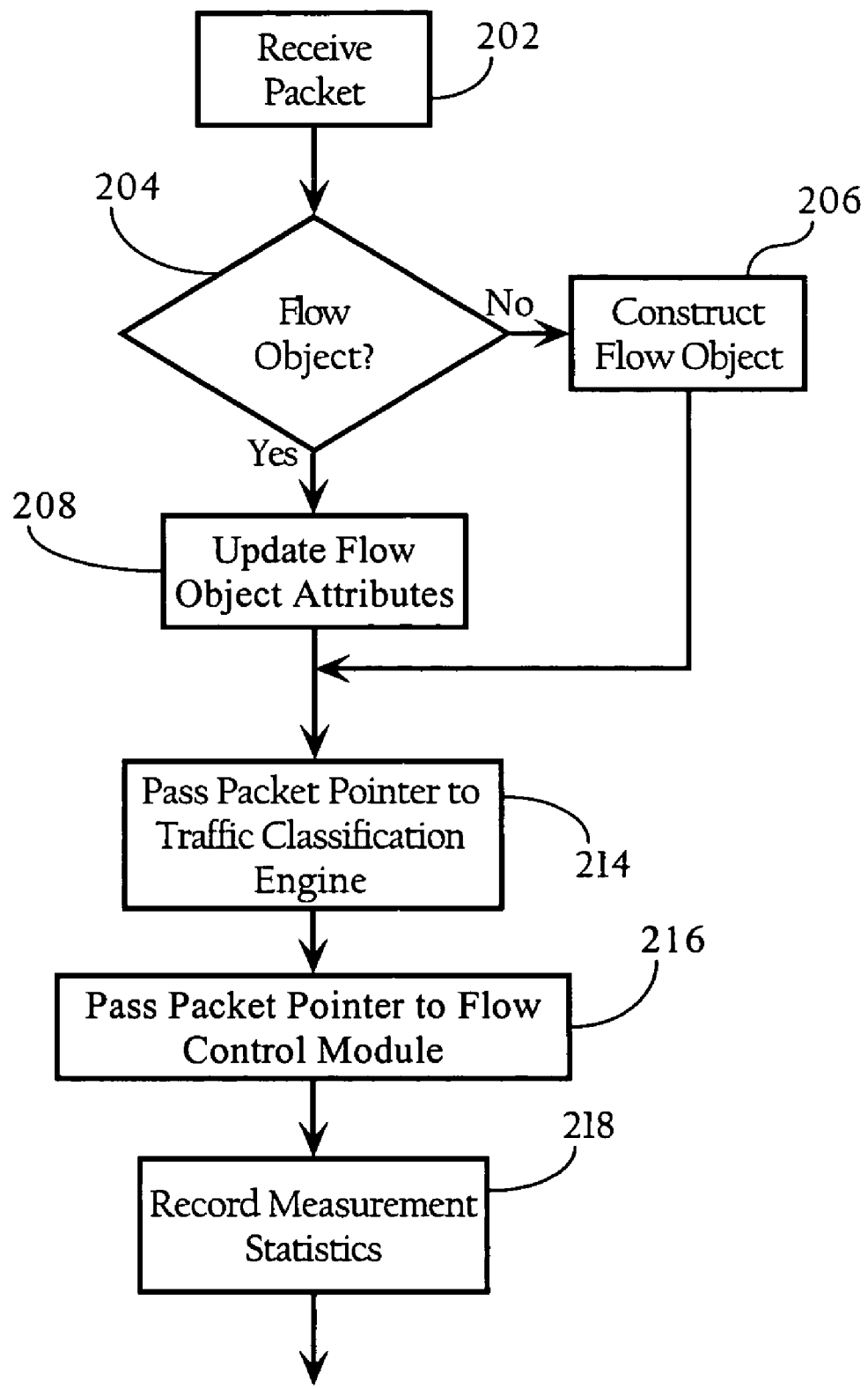
Fig._3

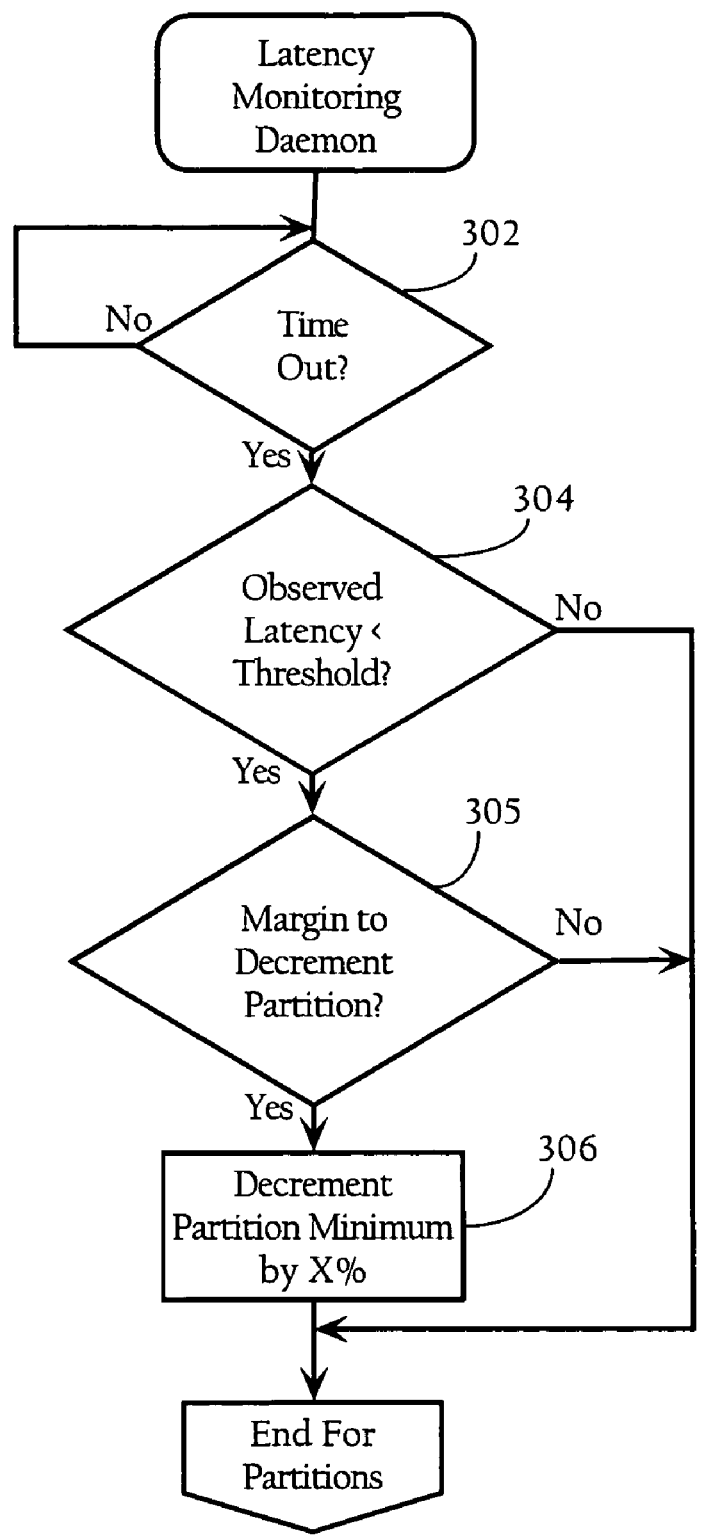
Fig._4A

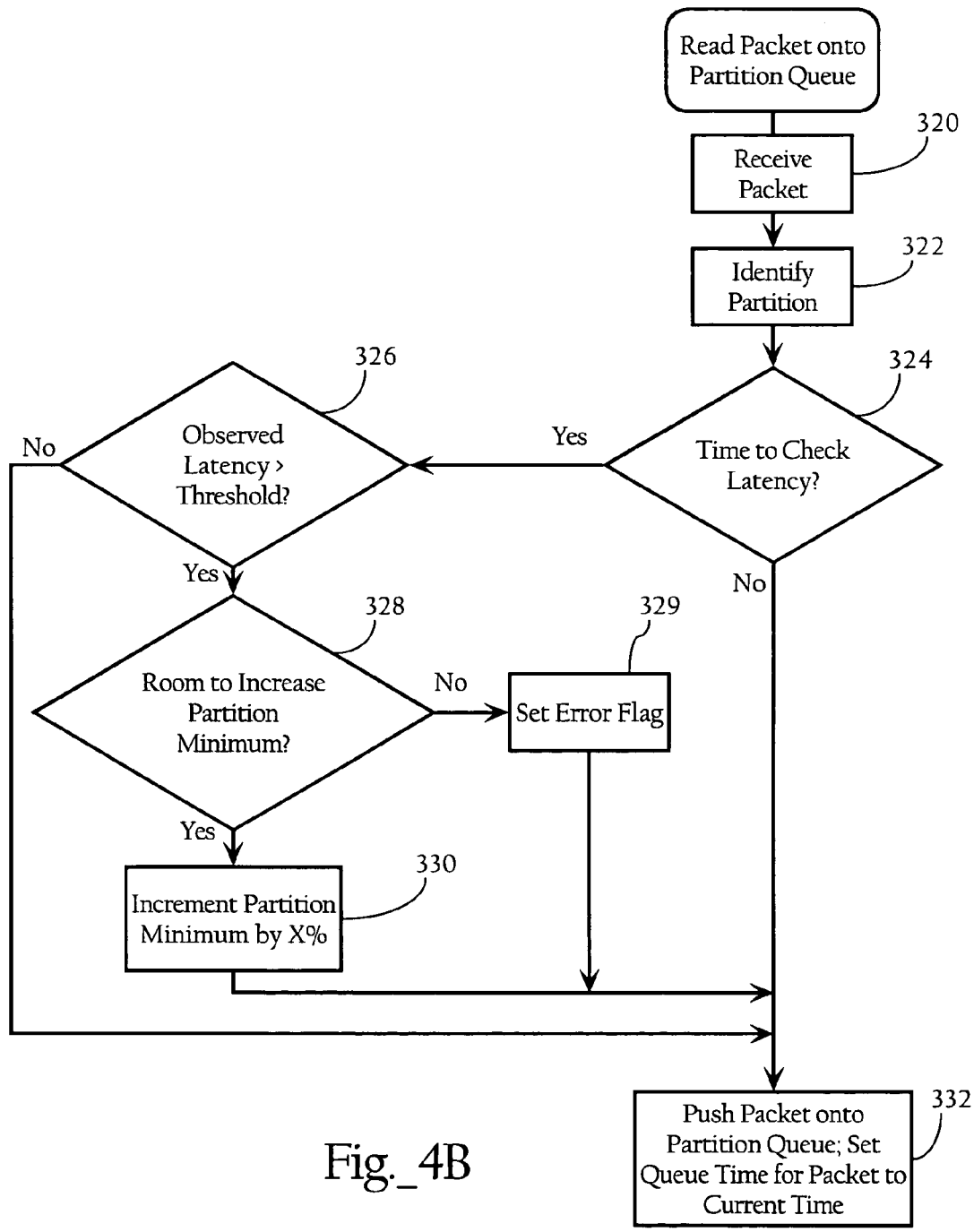
Fig._4B

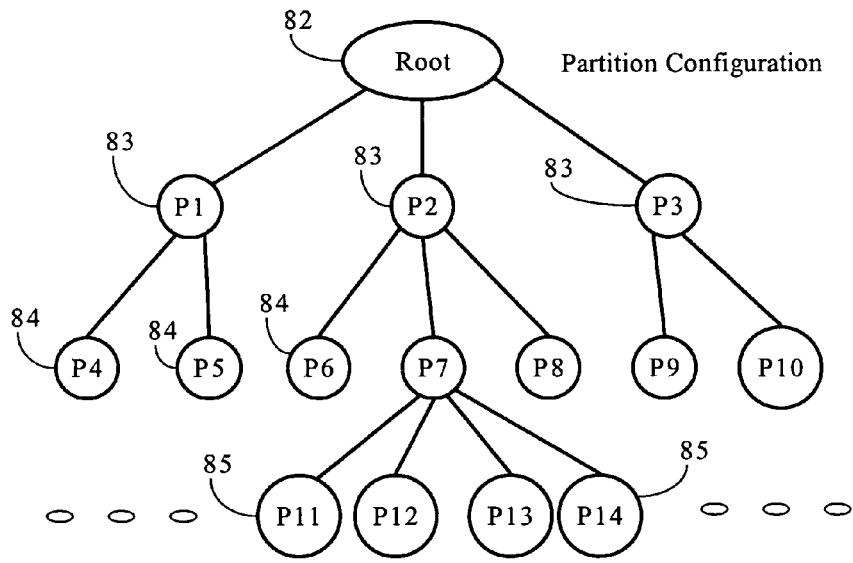
Fig._6
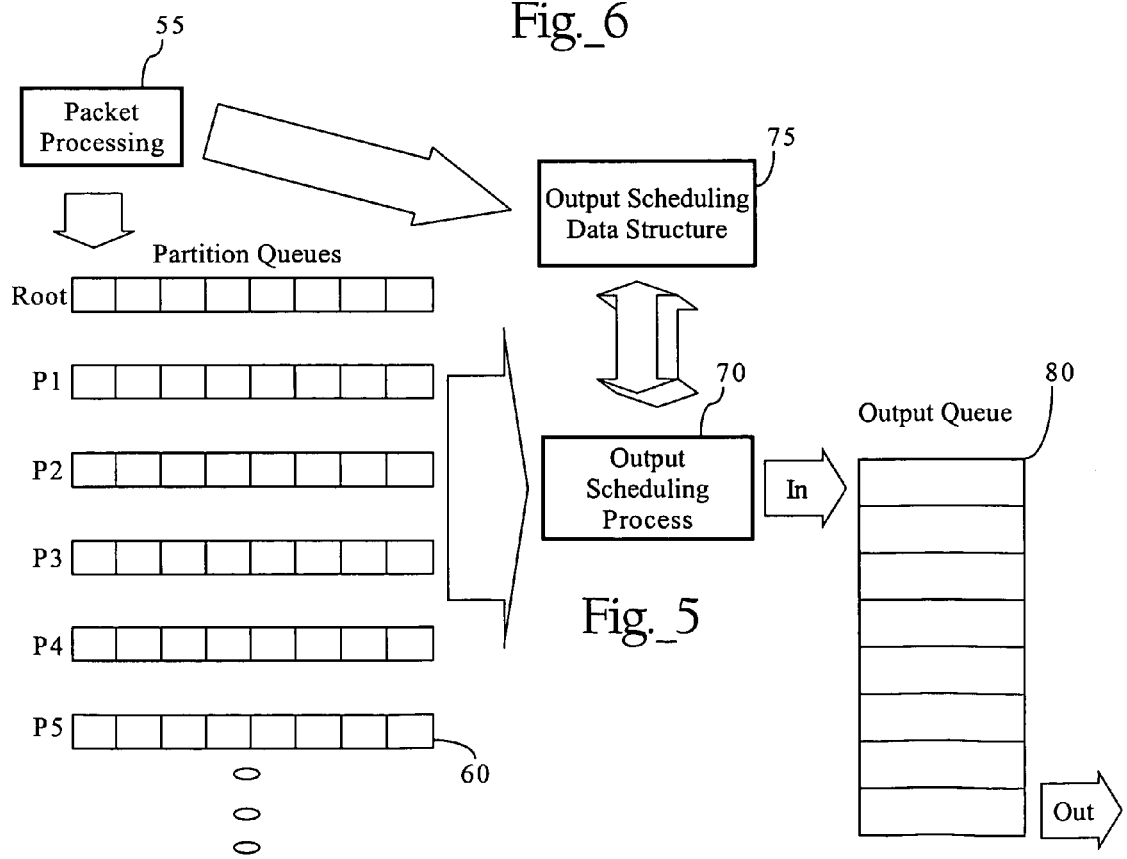
Fig._5

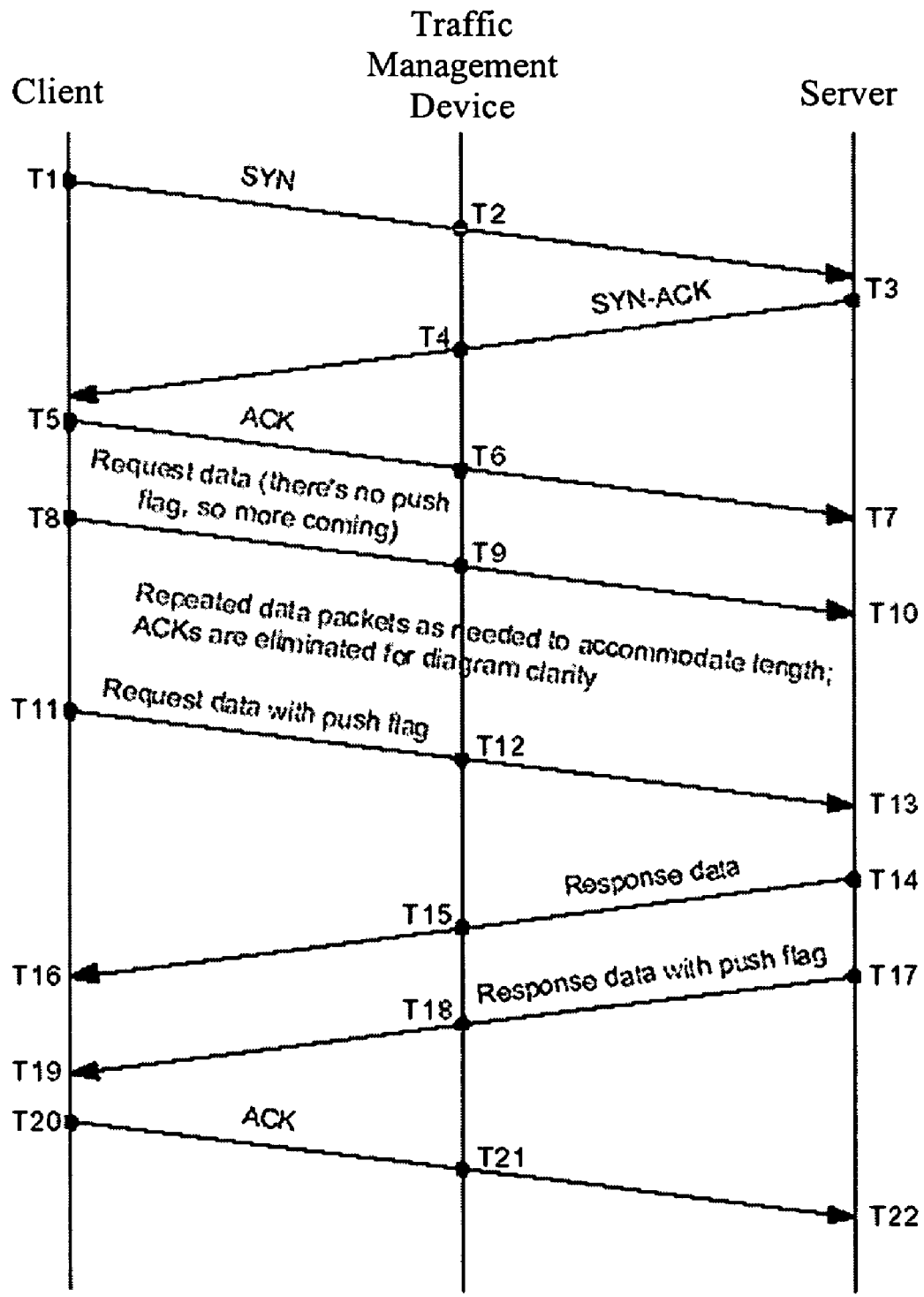
Fig._7

MODULATION OF PARTITION PARAMETERS ACHIEVING DELAY-BASED QOS MECHANISM

CROSS-REFERENCE TO RELATED PATENTS AND APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

FIELD OF THE INVENTION

The present invention relates to computer networks and, more particularly, to methods, apparatuses and systems directed to supporting service level agreements or other quality of service (QoS) requirements, goals or guarantees.

BACKGROUND OF THE INVENTION

Critical operational processes of businesses, governments, and institutions often rely on software applications that execute on distributed systems that communicate over networks (such as, Wide Area Networks (WANs) or Internet links). Proper performance of these applications is critical to continued operation of an enterprise's business processes and the productivity of employees. Disruptions to the network applications and business processes can be very costly, leading to lost employee productivity, lost revenue opportunities, and/or increased costs.

End-to-end performance—that is, the performance or response time measured between two hosts implementing a network application over a network—most closely represents the performance of a business process. Ideally, the performance of the network communication path between the two ends of a network application should be seamless. Indeed, one-way or round trip delay guarantees are often an integral part of service level agreement (SLA) specifications. In addition, for some network applications such as VoIP, the amount of network delay, in one or both directions along a communications path, may determine whether the data flows traversing a network can support mission-critical applications, or be of minimal to no use.

Generally, network delay may incorporate some or all of the following basic components—propagation, serialization, packetization and queuing delays. Propagation delay, based on the speed of light, is the time a signal spends in transit across a communications medium, such as a wire, cable or air. Serialization delay (also known as insertion delay) characterizes the time required to insert a signal corresponding to a packet on the communications medium. For example, the serialization delay or time to place one byte of information on a 64 Kbps circuit is 125 microseconds, while the serialization time required to place the same byte of information on an OC-3 circuit is 0.05 microseconds. Packetization delay is the delay associated with the process of collecting digital data for placement into the payload of a packet until enough samples are collected to fill the packet or cell payload. Queuing or buffering delay is the time a packet spends in the buffer of a node on the network while it waits on other packets to be serviced. Other related delays can relate to delays inherent to the network application, such as VoIP which also may include coding delay—the time to digitize and compress voice data signals.

Given a general understanding of the fixed and variable delay components and network application requirements, a delay budget can be calculated. The delay budget is the amount of delay permissible for a given network application implemented across the planned network while still meeting differentiated QoS objectives. For VoIP traffic, for example, the generally-accepted limit for good-quality voice connection delay is about 200 to 250 ms one-way. As delays rise over this amount, talkers and listeners become un-synchronized, rendering it difficult for call participants to determine whose turn it is to talk.

Given the importance of network application performance, a variety of technologies have been deployed to track delay metrics associated with computer networks and networked applications. Some network performance monitoring solutions rely on passive techniques (e.g., recording packet traces and arrival times), while others rely on active methods that inject synthetic traffic into the network. For example, copending and commonly owned U.S. patent application Ser. Nos. 09/710,442 and 10/812,198 disclose technologies that calculate the time traffic spends traveling between a client and a server and the time used by the server itself based on passive monitoring of packet arrival times at a network device deployed on a WAN link. Moreover, some network monitoring devices, such as the PacketShaper® network application traffic management device offered by Packeteer, Inc. of Cupertino, Calif., include synthetic transaction agents that inject synthetic traffic into the network to monitor network performance. Synthetic transaction agents are often deployed on carrier network equipment to track point-to-point service level agreements corresponding to a WAN circuit.

In addition, to facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. U.S. patent application Ser. No. 10/108,085 discloses data structures and methods for implementing a partition hierarchy.

Relative to a given network device deployed to control or manage resource utilization of data flows traversing a communications path, a partition is essentially a bandwidth allocation and queuing mechanism. That is, after a packet processor classifies each packet and pushes each packet onto a partition queue associated with the appropriate partition, another process, typically, loops through the partition queues to pop packets off the queues and populate an output queue. Minimum bandwidth guarantees corresponding to different partitions essentially establishes a preference by which a flow control mechanism arbitrates among the partition queues. For example, a flow control module, while arbitrating among the partition queues, may read more packets from partitions having a higher minimum guaranteed bandwidth relative to partitions have lower or no minimum bandwidth guarantees. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue.

Given that the network delay components discussed above are attributable to a variety of elements outside the control of any given network device, however, the partition parameters configured by a network administrator may not achieve intended or desired levels of performance-especially during times of network congestion. For example, while a network administrator may configure a partition for a given class of traffic (e.g., VoIP) with a minimum bandwidth guarantee, load on the network device itself, or network congestion generally, may cause the latency performance of the associated traffic class(es) to fall below acceptable levels. In light of the foregoing, a need in the art exists for methods, apparatuses and systems directed to an adaptive partitioning mechanism that responds to observed latency conditions. Embodiments of the present invention substantially fulfill this need.

SUMMARY OF THE INVENTION

The present invention provides methods, apparatuses and systems directed to an adaptive partitioning-mechanism responsive to observed latency conditions in a communications network. Embodiments of the present invention can be configured to adapt to changing network conditions and ensure that selected network applications meet desired QoS levels. In one implementation, the present invention provides a mechanism that adjusts the minimum bandwidth setting corresponding to a given partition in response to observed latency. According to one implementation, a latency threshold is configured relative to local queuing latency or a latency metric corresponding to the network itself. A process modulates the minimum bandwidth setting associated with one or more partitions in response to observed latency relative to the configured threshold.

DESCRIPTION OF THE DRAWINGS

FIG. 2 is a functional block diagram illustrating the functionality of a network application traffic management device, according to one implementation of the present invention.

FIG. 3 is a flow chart diagram showing a method, according to one implementation of the present invention, directed to processing data flows.

FIG. 4A is a flow chart diagram illustrating operation of a latency monitoring daemon according to one implementation of the present invention.

FIG. 4B is a flow chart diagram setting forth a method for adjusting partition minimums in response to observed latency.

FIG. 5 is a process flow diagram illustrating the overall process flow associated with the scheduling of packets for output.

FIG. 6 sets forth an exemplary hierarchical partition configuration according to an embodiment of the present invention.

FIG. 7 is a TCP diagram illustrating the measurement of response times associated with TCP transactions.

DESCRIPTION OF PREFERRED EMBODIMENT(S)

Figure 1:
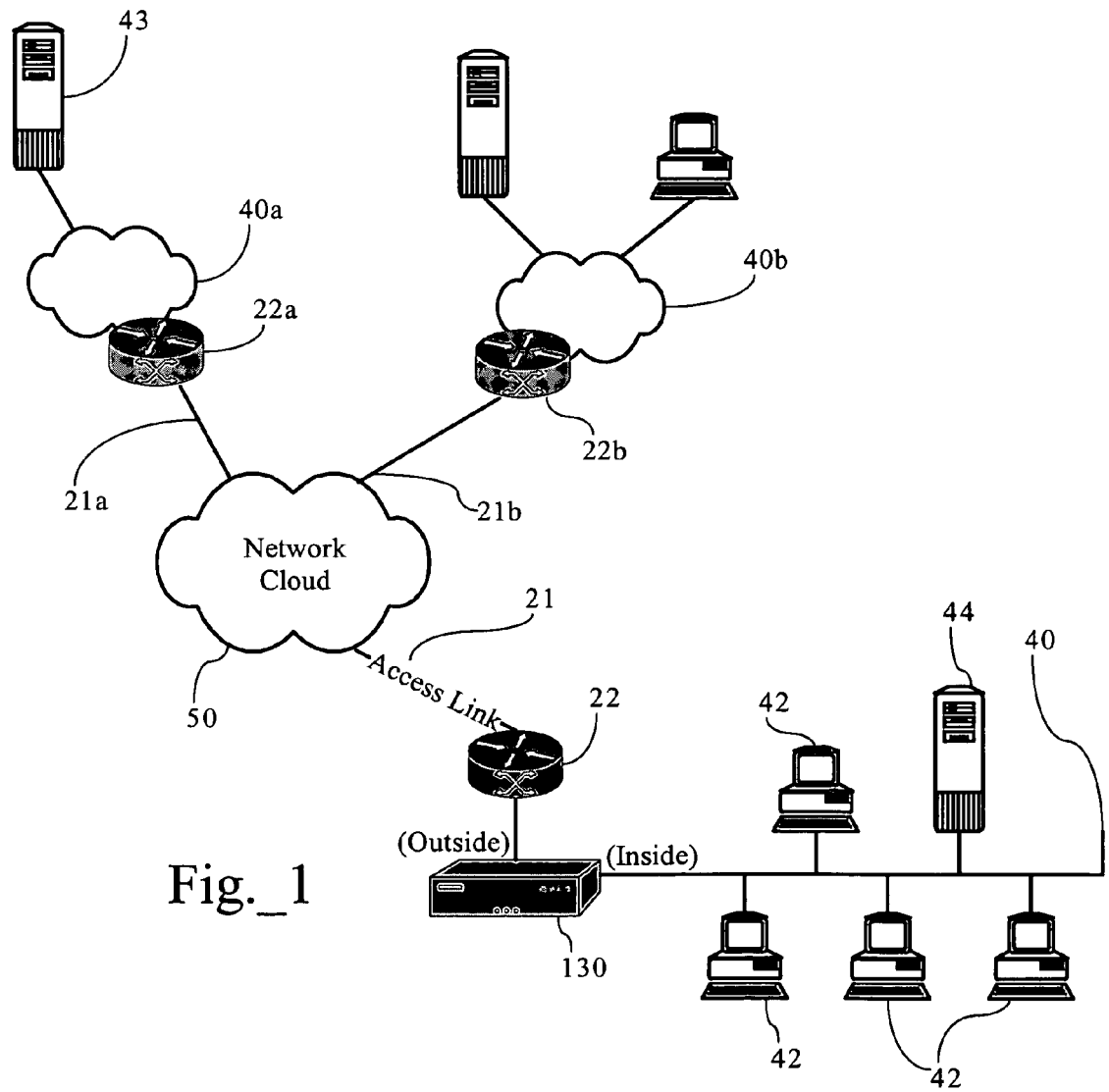
FIG. 1 is a functional block diagram illustrating a computer network system architecture in which an embodiment of the present invention may operate.

FIG. 1 illustrates an exemplary network environment in which embodiments of the present invention may operate. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks, such as network 40b, associated with the same administrative domain as networks 40, 40a, or a different administrative domain. As FIGS. 1 and 2 show, the first network 40 interconnects several TCP/IP end systems, including client devices 42 and server device 44, and provides access to resources operably connected to computer network 50 via router 22 and access Link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and networks 40a & 40b, can each be a local area network, a wide area network, or any other suitable network. As FIGS. 1 and 2 illustrate, application traffic management device 130, in one implementation, is deployed at the edge of network 40. As discussed more fully below, application traffic management device 130 is operative to classify and manage data flows traversing access link 21. In one implementation, application traffic management device 130 also includes functionality operative to monitor the performance of the network (such as network latency) and/or network applications.

As FIG. 2 illustrates, network application traffic management device 130, in one implementation, comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

As FIG. 2 illustrates, network device application processor 75, in one implementation, includes a packet processor 92, flow control module 94, traffic classification engine 96, and network performance module 98. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one implementation, flow control module 94 is operative to apply bandwidth utilization controls to data flows traversing the access link 21 in the inbound and/or outbound directions. Network performance module 98, as discussed more fully below, adaptively monitors the performance of one or more selected network applications or traffic classes.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate and/or per-traffic-class level. In one implementation, measurement engine 140 tracks queuing latency corresponding to the partitions implemented by flow control module 94.

Administrator interface 150 facilitates the configuration of application traffic management device 130 to adjust or change operational and configuration parameters associated with the device. For example, administrator interface 150 allows administrators to select identified traffic classes and associate them with traffic management policies, such as partitions. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. patents and patent applications identified above discuss the operation of packet processors that can be incorporated into embodiments of the present invention. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046, 980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or control block object. The identification of a server or client in a given transaction generally depends on the network protocols employed by the hosts. For example, in TCP flows, a client initiates a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

A.2. Traffic Classification Engine

As discussed above, traffic classification engine 96, in one implementation, is operative to classify data flows into one of a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as wetl as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like.

Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc. As discussed more fully below, in one implementation, traffic classification engine 96 triggers operation of host probing module 97 for a given data flow, if a service type identifier corresponding to a network application (as opposed to a protocol or service) is not identified within a threshold number of packets.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device 130, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 and 72, and the direction of packet traffic. For example, packets flowing from network interface 71 to network interface 72 (and vice versa) can be classified on that basis to eliminate any potential restrictions on classification of data flows in different network topologies. The "Local-Host" traffic class corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy for that traffic class. Administrator interface 150 also allows for the arrangement of traffic classes into a hierarchical classification tree. Application traffic management device 130 further allows an administrator to manually create a traffic class by specifying a set of matching rules and also automatically creates traffic classes by monitoring network traffic across access Link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.3. Flow Control Module

As discussed more fully below, flow control module 94 enforces partition-based bandwidth utilization controls on data flows traversing access link 21. In one implementation, flow control module 94 implements the deterministic partition scheduling functionality disclosed in U.S. application Ser. No. 10/108,085, incorporated by reference herein. Furthermore, as discussed more fully below, flow control module 94 includes functionality for adjusting minimum bandwidth guarantees for selected partitions based on observed latency, such as local queuing latency, or overall network latency. A partition operates to manage bandwidth for aggregate data flows associated with a traffic class. As discussed above, a partition is essentially a division of the capacity of access link 21. For example, a partition may simply be a grouping of data flows for purposes of associating the data flows with a partition queue. A partition, in one embodiment, can be configured to protect a network traffic class by guaranteeing a defined amount of bandwidth and/or limits a network traffic class by placing a cap on the amount of bandwidth a traffic class can consume. Partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions are arranged in a hierarchy—that is, partitions can contain partitions (see FIG. 6). For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a database software application traffic class, and sub-divide this parent partition into a large burstable child partition for its human resources department and a smaller burstable child partition for the accounting department. In addition, partitions may be static or dynamic. A dynamic partition is a partition that is created on demand as needed for a particular traffic classification. Dynamic partitioning of network resources is disclosed in U.S. patent application Ser. No. 09/966,538 identified above and incorporated by reference herein.

In one embodiment, a partition is created by selecting a traffic class and configuring a partition for it (or, in other implementations, associating an existing partition to it). As discussed above, configurable partition parameters include 1) minimum partition size (guaranteed bandwidth) (in bits per second); 2) whether it is burstable (that is, when this option is selected, it allows the partition to use available excess bandwidth; when the option is not selected the partition has a fixed size); and 3) maximum bandwidth to be used when the partition bursts. In one embodiment, burstable partitions may further include a bursting priority influencing access to excess bandwidth among partitions. In addition, a network administrator may also configure a latency threshold for one or more partitions, as discussed more fully below. Other implementations are possible. For example, each partition can simply be configured with a set of rules applied to network traffic that are applied to identify the appropriate partition in a manner independent from, or orthogonal to, the operation of traffic classification engine 96.

A.4. Network Performance and Latency Monitoring

As discussed above, partition parameters may be modulated in response to network latency conditions. In one implementation, network performance module 98 is operative to monitor the packet path in the inbound and outbound directions to gather various measurement data and compute the performance of one or more selected traffic classes and/or network applications. Network performance module 98 operates in connection with traffic classification engine 96, which classifies the data flows, as discussed above. In this manner, network performance module 98 can track network performance on a per-traffic-class (and per-partition) basis. In a typical configuration, the traffic classes for which performance is monitored generally correspond to network applications that an enterprise deems important or critical and, thus, have protected with partitions. In one implementation, network performance module 98, in one implementation, includes both passive and active network performance monitoring functionality that can be configured to adapt to monitored network application performance.

A.4.a. Monitoring Network or Application Performance

In one implementation, application or network performance is determined relative to response times, which is a primary indicator of a user's experience with a network application. In one implementation, network performance module 98 is operative to provide performance related statistics like network delay, server delay, and congestion metrics for selected network applications or other user-defined traffic classes, such as individual hosts, subnets, and for any transaction-oriented TCP traffic class. Network performance module 98 can break down the total observed delay, for each response-time measurement into network delay (time spent in transit) and server delay (time the server used to process the request). The location of traffic management device 130 at strategic points in a given network environment-monitoring all the traffic that passes—facilitates the accurate determination of response times. That is, because traffic management device 130 encounters all data flows transmitted to and from network 40, it can readily calculate the time network traffic spends traveling between a client and a server, the time used by the server, and the time spent on either side of application traffic management device 130 itself.

Network performance module 98, in one implementation, can make the following measurements or response time determinations:

1) total delay: The total time (in milliseconds) a transaction requires, beginning with a client's request and ending upon receipt of the response, corresponding to the end user's view of the time it takes for a transaction to complete.

2) network delay: The time (in milliseconds) spent in transit when a client and server exchange data. If a transaction requires a large quantity of data to be transferred, it is divided and sent in multiple packets. Network delay includes the transit time for all packets involved in a request-response transaction. The amount of time the server uses for processing a request is not included.

3) server delay: The time (in milliseconds) the server uses to process a client's request after it receives all required data. The server delay is the time after the server receives the last request packet and before it sends the first packet of response (not receipt acknowledgment, but actual response content). This is the time the server takes to process the client's request.

4) normalized network delay: The time (in milliseconds) per kilobyte spent in transit when a client and server exchange data. If a transaction requires a large quantity of data to be transferred, it is divided and sent in multiple packets. Because network delay increases as transaction size increases, it can be misleading when comparing times. Normalized network delay eliminates size as a factor to facilitate comparisons across flows and applications.

5) round trip time (RTT): The time (in milliseconds) spent in transit when a client and server exchange one small packet. Even if a transaction's data is split into multiple packets, RTT includes only one round trip of a single packet between client and server.

6) Packet exchange time (PET): The time (in milliseconds) between a packet's departure from traffic management device and receipt of the corresponding acknowledgment. This metric reflects only the delay for the network on one side of traffic management device 130. U.S. application Ser. No. 09/710, 442 discloses methods and systems for monitoring network delay on an application-level basis attributable to different networks by monitoring data flows at a demarcation point between the two networks. Other network performance attributes can also be monitored, such as jitter.

A.4.a.1. Calculating Transit Delays

To compute the delay measurements discussed above, network performance module 98 tracks the course of a client-server (or peer-to-peer) transaction, making various packet arrival time and size observations, and uses information about a TCP connection (or other network protocol connection) to differentiate one portion of the exchange from another in order to compute accurate performance statistics. FIG. 7 illustrates the typical components associated with a TCP connection. FIG. 7 is a standard TCP diagram showing the course of a network transaction over time. Arrows indicate packets traveling the network between client and server. Time increases as one descends the diagram, with successive event times noted as TN, T1 representing the first event and T22, the last.

As FIG. 7 illustrates, a client initiates a server connection with a SYN at time T1. Network performance module 98 notes the SYN at time T2 and forwards it along to the server. The server responds with a SYN-ACK at time T3. Network performance module 98 notes the SYN-ACK at time T4, passing it along as shown. TCP stacks usually respond with a SYN-ACK very rapidly, within the kernel and with no context switches. The SYN-ACK follows the SYN almost immediately. Therefore, time T4 minus time T2 results in an accurate measure of the round-trip network delay between traffic management device 130 and the server. This interchange produces the first quantity, the server transit delay (STD):

$$\text{STD}=T4-T2$$

The client receives the SYN-ACK and issues the final ACK of the three-way handshake at time T5. Network performance module 98 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 130. The client transit delay (CTD):

$$\text{CTD}=T6-T4$$

Putting together the server transit delay (STD) and the client transit delay (CTD) yields the total delay between the client and the server for a single round trip.

$$\text{RTT (Round-Trip Time)}=\text{STD}+\text{CTD}$$

A.4.a.2. Determining the Server Delay

The client initiates its request at time T8, arriving at the traffic management device 130 at time T9. For large requests, the request is divided into multiple packets. The TCP diagram of FIG. 6 eliminates the server's corresponding ACKs to simplify the picture, because these ACKs are not material to the calculations described herein. The last request packet, sent at time T11, has its Push Flag set to one indicating it is the final packet. Traffic management device 130 notes the time of this last request packet at T12. After the last request packet arrives at the server at time T13, the server assembles the request, conducts whatever processing is required for the request, and assembles its response. The server sends the first packet (of potentially several response packets) at time T14.

Time T14 minus time T13 is the actual server-processing time required for the request, but these times are not visible to network performance module 98. However, network performance module 98 knows that the server's processing time occurred after it saw the last request packet and before it saw the first response packet (time T15 minus time T12). Additionally, it knows that another component of this interval was the transit time from traffic management device 130 to the server and back again. Conveniently, it already has that figure—i.e., the server transit delay (STD). In addition, there is a small amount of time spent serializing the bits in the response packet and preparing them for their bit stream. This time was not included in the original server transit delay because the SYN and ACK packets are extremely small. Network performance module 98, in one implementation, knows the size of the packet, calculates this preparation time accordingly (□1), and adds it to the STD before subtracting the sum from the time difference. Therefore, $$\text{Server Delay}=(T15-T12)-(\text{STD}+\square 1)$$

A.4.a.3. Determining the Total Delay

The termination of a transaction is generally important to calculating the total delay; however, it is not always obvious when a transaction ends. The combination of a Push flag from the server and its corresponding ACK from the client frequently signal the end of a transaction. But long transactions often insert Push flags throughout the transaction. In addition to monitoring Push flags, network performance module 98 uses a timer to track transactions and uses the following rules:

1) If a Push flag seems to indicate a transaction's end, but the server continues sending more data, the timer continues to advance.

2) If the client sends a new request, network performance module 98 ends the last transaction and records the last time noted.

3) If there is no activity from either the server or the client, network performance module 98 considers the transaction complete and records the last time noted.

4) When the connection ends, traffic management device 130 sees the FIN and records the last time noted.

Using these techniques, network performance module 98 notes the last response packet at time T18, makes sure that it saw all required ACKs for the request packets, and verifies that the last response packet indeed represented the end of the transaction. After the client receives the final response packet at time T19, it sends an ACK. The ACK reaches traffic management device 130 at time T21. The client's perspective of response time starts with sending the first request packet (T8) and ends with receipt of the final response packet (T20). Network performance module 98 sees that interval as time T9 to time T21. Although this is a close estimate of the client's view, it misses some extra preparation time for serializing the first request packet, assuming it is larger than the final ACK. Because network performance module 98 knows the packet-size difference, however, it can calculate this small discrepancy ($\square$2). Therefore, Total delay=(T21−T9)+$\square$2

A.4.a.4. Determining Network Delay

Once network performance module 98 computes the server delay and the total delay, it can calculate the amount of time the transaction spent in transit.

Network delay=(Total delay)−(Server delay)

Whereas the RTT represents the transit time for just one round trip, the network delay reflects all transit time for the transaction. If the transaction's data is large, multiple packets need to make their way to and from the server. Only the network delay reflects this overhead. The network delay is not necessarily an even multiple of the RTT because multiple packets are not sent consecutively but tend to overlap to varying degrees. In addition, because network and total delay are products of transaction size, ping times and RTM measurements are not comparable.

A.4.a.5. Analysis of Response Time Measurements

Network performance module 98, in one implementation, collects packet arrival time observations and sizes and computes response time measurements for the data flows and stores the computed measurement values in one process. A separate process accesses the stored values to analyze the performance of one or more network applications in relation to one or more performance thresholds. Depending on the results of the analysis, this process can result in changes to partition parameters applied to a given network application or other traffic class. Network performance module 98, in one implementation, collects response time measurements associated with given traffic class identifiers, maintains the data in volatile memory for a given time interval (e.g., 1 minute), and then stores the data in non-volatile memory (similar to measurement engine 140). In another implementation, measurement engine 140 can be configured to store the relevant measurement variables. In another implementation, network performance module 98 can average the response time measurements over the time interval and stores the average response time measurements for each traffic class (or partition). Network performance module 98 further includes APIs and associated functionality that aggregates raw response time measurement data over specified time intervals (e.g., the last hour, 15 minutes, day, etc.) on a traffic class or network-wide basis. A separate process, using these APIs, can compute average response times over desired intervals and compare these response times to pre-configured performance thresholds.

B. Operation

FIG. 5 illustrates the overall process flow associated with an output scheduling process according to an embodiment of the present invention. As discussed in U.S. application Ser. No. 10/108,085, application traffic management device 130 processes packets traversing it to identify traffic classes and corresponding partitions associated with the packets (see FIG. 5, #55). Application traffic management device 130 then pushes the packets or pointers to the packets on corresponding partition queues 60. In one embodiment, if the partition associated with the packets was previously inactive, the packet processing process 55 also updates output scheduling data structure 75 to add a corresponding partition identifier, as discussed more fully below, to allow for scheduling of the packets for output. As FIG. 5 illustrates, an output scheduling process 70 operates on output scheduling data structure 75 to select partitions, pops packets off respective partition queues according to the methods described herein, and pushes the packets on output queue 80. Another process associated with application traffic management device 130 releases the packets from output queue 80 and performs other processes such as logging of data associated with measurement engine 140.

FIG. 6 provides, for didactic purposes, an exemplary hierarchical partition configuration. Root partition node 82 represents the total capacity of access link 21 in either the outbound or inbound direction. Partition nodes 83 represent a first set of partitions allocating the capacity of access link at a first level. As FIG. 6 shows, each parent partition may include child partitions represented as partition nodes 83, 84, and 85. For didactic purposes, assume that access link 21 is a T1 line and, thus, provides maximum available bandwidth of 1.5 Mbps. Partitions P1, P2, and P3 may be configured to equally divide access link 21 into 0.5 Mbps partitions at a first level. In addition, child partitions P4 and P5 may further divide parent partition P1 into a 0.2 Mbps partition (P4) and a 0.3 Mbps partition (P5). Similarly, child partitions P9 and P10 may be configured to further divide parent partition P3 into a 0.1 Mbps (P9) and 0.4 Mbps (P10). Child partitions P6, P7 and P8 may divide parent partition P2 into two 0.1 Mbps partitions (P6 and P8), and a 0.3 Mbps partition (P7). Lastly, partitions P11, P12, P13 and P14 may equally divide partition P7 into four 75 Kbps partitions. Of course, any suitable partition configuration may be employed, including the configuration of additional child partitions of any partition node illustrated in FIG. 6. Still further, other configurations are possible. For example, the root node may represent the access link in both the inbound and outbound direction, while child partitions from the root can correspond to traffic encountered at a given network interface (such as interface 71) and destined for egress from a second network interface (such as interface 72).

B.1. Packet Processing and Classification

FIG. 3 illustrates the overall process flow, according to one implementation of the present invention, directed to the operation of application traffic management devices 130. In one embodiment, packet processor 92 receives a data packet (FIG. 3, 202) and determines whether flow database 135 contains an existing control block object corresponding to the data flow (204) (see Section A.1., supra). If no control block object corresponds to the data packet, packet processor 92 constructs a control block object including attributes characterizing the data flow, such as source address, destination address, etc. (206) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, protocol type, pointers to variable-length information in a dynamic memory pool, and other parameters characterizing the data flow.

As FIG. 3 illustrates, packet processor 92 updates, for existing data flows, attributes of the flow object in response to the packet such as the packet count, last packet time, and the like (208). Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow.

As FIG. 3 illustrates, packet processor 92 then passes a pointer to the packet, in one implementation, to traffic classification engine 96, which operates as discussed above to classify the data flow (214). Lastly, the packet is passed to flow control module 94 (218), which performs flow control operations on the data packets. As FIG. 3 illustrates, application traffic management device 130 may also perform other operations in response to arrival of the packet. For example, measurement engine 140 may record certain measurement variables on an aggregate or per-traffic class basis (218).

B.2. Modulation of Partition Parameters

FIGS. 4A and 4B illustrate operation of the aspect of network application traffic management device 130 directed to modulating partition parameters in response to observed latency conditions. In one implementation, the process by which partition parameters are increased is incorporated into the process(es) by which packets are read onto partition queues, while a separate process (in one implementation, executed by a delay monitoring daemon) periodically checks whether configured latency requirements are met and conditionally decreases partition parameters.

FIG. 4B illustrates a method directed to increasing the minimum bandwidth parameter corresponding to a partition in response to observed latency. As FIG. 4B illustrates, the minimum bandwidth parameter can be adjusted as part of the process by which a packet is read onto a corresponding partition queue. Specifically, after flow control module 94 receives a packet (320) and identifies the appropriate partition for the packet (322), it can then determine whether it is time to determine whether the partition's latency requirements are satisfied (324). In one implementation, this time-based determination is made relative to a partition adjustment interval. In one implementation, the partition adjustment interval is complimentary to the interval used by the delay monitoring daemon. For example, in one implementation, the two intervals are equal. As FIG. 4B illustrates, assuming it is time to update the partition minimum, flow control module 94 determines whether the observed latency is greater than a latency threshold (326). Flow control module 94, in one implementation, also determines whether there is room to increase the partition minimum (328). Specifically, in one implementation, there is a limit to which a given partition's minimum bandwidth setting can be increased depending on the minimum bandwidth setting associated with the parent partition of the instant partition. For example, assume for didactic purposes that a network administrator has configured a parent partition with a minimum bandwidth setting of 1.5 Mbps (bits per-second), and a child partition with no minimum bandwidth guarantee and a latency threshold of 250 milliseconds. If the observed latency for network traffic corresponding to the child partition crosses the threshold for a sufficient period of time, the minimum bandwidth guarantee can be increased up to the minimum bandwidth guarantee of the parent partition (1.5 Mbps, in the example). If, due to the minimum bandwidth setting of the parent partition, the minimum bandwidth setting of the child partition can no longer be increased and the latency threshold is nevertheless exceed, network application traffic management device 130 can be configured to flag an error condition (329), which a network administrator may correct either by making provisions to be able to further increase the partition's minimum setting or by increasing the latency threshold setting of the partition. In another implementation, an adaptive response mechanism can automatically adjust the partition parameters in response to the error condition. Otherwise, if there is sufficient room to increase the minimum bandwidth setting for the partition, flow control module 94, in one implementation, increments the minimum bandwidth setting by a fixed percentage (330). As FIG. 4B illustrates, flow control module 94 pushes the packet on the appropriate partition queue and sets the queue time for the packet to the current time (332).

FIG. 4A illustrates operation of a latency monitoring daemon that is invoked periodically to decrease the minimum bandwidth settings for one or more partitions. As FIG. 4A illustrates, the latency monitoring daemon, in one implementation, operates on an individual basis as to each partition that includes a maximum latency threshold parameter. When a timer corresponding to a given partition times out, the daemon determines whether the observed latency corresponding to the partition is greater than a threshold latency (304). In one implementation the threshold latency is a parameter that is individually configurable for each partition. In one implementation, the latency monitoring daemon then determines whether decrementing the minimum bandwidth for the partition would exceed the minimum bandwidth parameter originally configured for the partition (305). If both conditions 304 and 305 are met, the latency monitoring daemon, in one implementation, decrements the minimum bandwidth parameter by a fixed percentage of the current minimum bandwidth parameter (306). In one implementation, the fixed percentage is a user-configurable parameter. In another implementation, the latency monitoring daemon may decrement the minimum bandwidth parameter by an absolute amount, as opposed to a percentage of the minimum bandwidth. In still another implementation, the delay monitoring daemon may operate to reduce the minimum bandwidth to zero, omitting step 305, if the observed latency remains below the threshold value for a sufficient period of time. In another implementation, the latency monitoring daemon may operate only on partitions for which sufficiently recent latency data has been collected. The interval at which the delay monitoring daemon operates can be a uniform periodic interval, such as 6 seconds. In other implementations, the interval is a user-configurable parameter. Still further, in other implementations, the interval can be dynamically adjusted, as to each partition, based on the proximity of observed latency metrics to corresponding latency thresholds. In addition, the latency monitoring daemon according to another implementation of the present invention can implement a single timer for all partitions for which a latency threshold has been configured and adjust the minimum bandwidth settings in a looped process.

As discussed above, flow control module 94 implements the deterministic partition output scheduling process disclosed in U.S. application Ser. No. 10/108,085. Accordingly, modulation of the minimum bandwidth setting for a given partition modifies the bandwidth allocated to the partition and, therefore, the amount of time by which time stamps are increased. Furthermore, as discussed therein, the bandwidth allocated to a given partition affects the rate at which the partition is selected by the output scheduling process and, thus, the length of time packets are buffered in the corresponding partition queue.

The present invention is capable of being used in a variety of configuration modes. For example, the latency threshold for a given partition can be configured based on the queuing or buffering delay associated with the actual partition implemented by network traffic management device 130. That is, the latency threshold can be compared to a running, or weighted moving, average of the time packets are buffered in a given partition queue, by comparing the queuing time (see FIG. 4B) packets to the time they are either pushed onto an output queue or transmitted from application traffic management device 130. In other implementations, the latency threshold can be configured relative to observed network latency metrics, such as network delay, normalized network delay, round trip time and normalized network delay. In addition, the network latency conditions can be measured with respect to synthetic transactions corresponding to a given partition. U.S. application Ser. No. 11/027,744 discloses the use of synthetic transactions to assess network latency.

In use, a network administrator configures one or more partitions, such as the hierarchical partition configuration illustrated in FIG. 6. As to one or more selected partitions, a network administrator can configure a latency threshold (e.g., max. queuing latency, network latency, etc.). In addition, a network administrator may also configure a minimum bandwidth setting for the partition as well. In either option, application traffic management device 130 modulates the minimum bandwidth setting for that partition in response to observed latency relative to the configured threshold. For example, a user may configure a VoIP traffic class and a partition for the VoIP traffic class, including a maximum queuing latency of 200 milliseconds. Assuming that the queuing delay is the most significant portion of the network delay, it can thus be controlled to achieve delay-based QoS. In addition, the latency threshold can be based, as discussed above, on network latency. In one implementation, the network latency measurements discussed above can be divided by two to compute an estimated one-way network delay in applications where one-way network delay is an important metric. In other implementations, the network latency metrics themselves can be used in applications or traffic classes where round-trip times are of greater concern to network application performance.

Lastly, although the present invention has been described as operating in connection with end systems and networks employing the TCP, IP and Ethernet protocols, the present invention has application in computer network environments employing any suitable transport layer, network layer and link layer protocols. Moreover, while the present invention has been described as operating in connection with the partitioning mechanism disclosed in U.S. application Ser. No. 10/108,085, the present invention can be used in connection with any partitioning mechanism where a minimum bandwidth setting directly or indirectly affects queuing latency. Accordingly, the present invention has been described with reference to specific embodiments. Other embodiments of the present invention will be apparent to one of ordinary skill in the art. It is, therefore, intended that the claims set forth below not be limited to the embodiments described above.

The invention claimed is:

1. A method comprising
   receiving, at a network device, packets of data flows transmitted between hosts connected to a network;
   identifying partitions of a partition configuration for the received packets, wherein the partitions of the partition configuration define bandwidth allocations, and wherein one or more partitions of the partition configuration includes a minimum bandwidth allocation;
   buffering the received packets in association with partition queues corresponding to the identified partitions;
   emitting, from the network device, the received packets according to the bandwidth allocations of the partitions;
   monitoring a latency condition associated with at least one partition having a minimum bandwidth allocation; and
   modulating the minimum bandwidth allocation associated with the at least one partition in response to changes in the monitored latency condition, wherein the latency condition is the average queuing latency over a time interval associated with the at least one partition.

2. A method comprising
   receiving, at a network device, packets of data flows transmitted between hosts connected to a network;
   identifying partitions of a partition configuration for the received packets, wherein the partitions of the partition configuration define bandwidth allocations, and wherein one or more partitions of the partition configuration includes a minimum bandwidth allocation;
   buffering the received packets in association with partition queues corresponding to the identified partitions;
   emitting, from the network device, the received packets according to the bandwidth allocations of the partitions;
   monitoring a latency condition associated with at least one partition having a minimum bandwidth allocation; and
   modulating the minimum bandwidth allocation associated with the at least one partition in response to changes in the monitored latency condition, wherein the observed latency condition is network delay corresponding to data flows previously buffered in the partition queue.

3. The method of claim 1 wherein the modulating step comprises adjusting the minimum bandwidth allocation in response to the monitored latency condition relative to a threshold latency value.

4. A method comprising
receiving, at a network device, packets of data flows transmitted between hosts connected to a network;
identifying partitions of a partition configuration for the received packets, wherein the partitions of the partition configuration define bandwidth allocations, and wherein one or more partitions of the partition configuration includes a minimum bandwidth allocation;
buffering the received packets in association with partition queues corresponding to the identified partitions;
emitting, from the network device, the received packets according to the bandwidth allocations of the partitions;
monitoring a latency condition associated with at least one partition having a minimum bandwidth allocation; and
modulating the minimum bandwidth allocation associated with the at least one partition in response to changes in the monitored latency condition, wherein the latency condition is the queuing latency associated with the at least one partition, wherein the at least one partition includes a configured threshold latency value; and wherein the modulating step comprises increasing the minimum bandwidth allocation of the partition if the observed latency exceeds the threshold latency value.

5. The method of claim 4 wherein the modulating step further comprises decreasing the minimum bandwidth allocation of the at least one partition if the observed latency returns below the threshold latency value.

6. The method of claim 1 wherein the partitions of the partition configuration are arranged in a hierarchical partition configuration.

7. An apparatus implementing a delay-based QoS partitioning mechanism, comprising
a packet processor operative to
receive a data packet;
identify a partition corresponding to the data packet;
a partitioning module operative to
buffer the data packet in a partition queue corresponding to the identified partition;
schedule the data packet for transmission from the apparatus based, at least in part, on a minimum bandwidth setting associated with the identified partition; and
wherein the apparatus is operative to modulate the minimum bandwidth setting of the identified partition in response to an observed latency condition, wherein the latency condition is the average queuing latency over a time interval associated with the at least one partition.

8. An apparatus implementing a delay-based QoS partitioning mechanism, comprising
a packet processor operative to
receive a data packet;
identify a partition corresponding to the data packet;
a partitioning module operative to
buffer the data packet in a partition queue corresponding to the identified partition;
schedule the data packet for transmission from the apparatus based, at least in part, on a minimum bandwidth setting associated with the identified partition; and
wherein the apparatus is operative to modulate the minimum bandwidth setting of the identified partition in response to an observed latency condition, wherein the observed latency condition is network delay corresponding to data flows previously buffered in the partition queue.

9. The apparatus of claim 7 wherein the apparatus is operative to adjust the minimum bandwidth setting in response to the observed latency condition relative to a threshold latency value.

10. An apparatus implementing a delay-based QoS partitioning mechanism, comprising
a packet processor operative to
receive a data packet;
identify a partition corresponding to the data packet, wherein the partition includes a configured threshold latency value, and a configured minimum bandwidth setting;
a partitioning module operative to
buffer the data packet in a partition queue corresponding to the identified partition;
schedule the data packet for transmission from the apparatus based, at least in part, on a minimum bandwidth setting associated with the identified partition; and
wherein the apparatus is operative to modulate the minimum bandwidth setting of the identified partition in response to an observed latency condition, wherein the observed latency condition is network delay corresponding to data flows previously buffered in the partition queue; and wherein the apparatus is operative to increase the minimum bandwidth setting of the partition if the observed latency exceeds the threshold latency value.

11. The apparatus of claim 10 wherein the apparatus is further operative to decrease the minimum bandwidth setting of the partition if the observed latency returns below the threshold latency value.

12. An apparatus implementing a delay-based QoS partitioning mechanism, comprising
a memory comprising
at least one partition queue corresponding to a partition, wherein at least one of the partitions includes a minimum bandwidth setting and a latency threshold; and
an output scheduling data structure comprising a partition object corresponding to the at least one partition queue; wherein the at least one partition object comprises a partition identifier and a time stamp;
a packet processor operative to
receive a data packet,
identify a partition queue from the at least one partition queue;
push a pointer to the data packet on the identified partition queue;
an output scheduler operative to:
sort partition objects in the output scheduling data structure based on the corresponding time stamps;
select the partition object in the output scheduling data structure with the lowest time stamp; and
update the time stamp of the selected partition object based in part on the minimum bandwidth setting corresponding to the selected partition; and
a latency monitoring module operative to adjust the minimum bandwidth setting for at least one partition based on an observed latency condition.

13. The apparatus of claim 12 wherein the observed latency condition is the queuing latency associated with the identified partition.

14. The apparatus of claim 12 wherein the observed latency condition is the average queuing latency of the identified partition over a time interval.

15. The apparatus of claim 12 further comprising a network performance module operative to record packet arrival times for data packets associated with respective partitions;
compute a network delay metric for one of the partitions based on the recorded packet arrival times; and wherein the observed latency condition is network delay metric.

16. The apparatus of claim 12 wherein the apparatus is operative to adjust the minimum bandwidth setting in response to the observed latency condition relative to a threshold latency value.

17. The apparatus of claim 12 wherein the minimum bandwidth setting associated with a partition causes the output scheduler to provide a minimum guaranteed transmission rate for packets queued in a corresponding partition queue.

* * * * *